United States Patent [19]

Razzano

[11] Patent Number: 5,559,183
[45] Date of Patent: Sep. 24, 1996

[54] SILICONE OIL-SILICA FILLER PASTE USEFUL IN LIQUID INJECTION MOLDING APPLICATIONS, METHOD FOR MAKING, AND USE

[75] Inventor: John S. Razzano, Cohoes, N.Y.

[73] Assignee: General Electric Company, Waterford, N.Y.

[21] Appl. No.: 474,218

[22] Filed: Jun. 7, 1995

[51] Int. Cl.$^6$ .................................................. C08L 83/04
[52] U.S. Cl. ............... 524/862; 264/331.11; 106/287.13; 523/212; 524/588; 524/866; 528/15
[58] Field of Search .................. 528/15; 264/331.11; 106/287.13; 523/212; 524/588, 862, 866

[56] References Cited

U.S. PATENT DOCUMENTS 3,159,662  12/1964  Ashby .
3,220,972  11/1965  Lamoreaux .
3,635,743  1/1972  Smith .
3,775,452  11/1973  Karstedt .
3,884,866  5/1975  Jeram et al. .
3,953,487  4/1976  Kratel .
5,340,560  8/1994  Rohr et al. .

*Primary Examiner*—Melvyn I. Marquis

[57] ABSTRACT

Silicone oil-silica filler paste is provided which can be used in liquid injection molding applications. The silicone paste is made by blend reinforcing silica filler with silicone oil while it is refrigerated to produce a material having an improved application rate.

10 Claims, No Drawings

SILICONE OIL-SILICA FILLER PASTE USEFUL IN LIQUID INJECTION MOLDING APPLICATIONS, METHOD FOR MAKING, AND USE

BACKGROUND OF THE INVENTION

The present invention relates to a paste comprising a vinyl polydiorganosiloxane oil and a reinforcing silica filler, and a method for making such paste. More particularly, the present invention relates to a liquid injection molding(LIM) procedure using a silicone paste paste which is made by adding a reinforcing silica filler to an agitated vinyl substituted polydiorganosiloxane oil at a temperature of about −10° C. or less.

A typical LIM silicone composition is shown by Jeram et al. U.S. Pat. No. 3,884,866, directed to high strength addition-cured organopolysiloxane compositions. There is shown, a multi-component combination of a vinyl-containing polydiorganosiloxane fluid, a hydrogen-containing polydiorgansiloxane fluid, an effective amount of a platinum catalyst, and a reinforcing filler, such as a fumed silica filler. Generally, two component mixtures are pumped and mixed at reasonable velocities using conventional LIM equipment to a preheated mold and rapidly cured to produce a rubber part. Component A, can be a mixture comprising a vinyl-containing polydiorganosiloxane fluid, a silica filler, and an effective amount of a platinum catalyst; component B often consists of a hydrogen containing polydiorganosiloxane fluid, in combination with other ingredients of component A except platinum.

LIM products often present a special challange to users of silicone oils, which preferably have a viscosity of from about 20,000 to 100,000 centipoise for easy pumping. However, when filled with high levels of reinforcing filler, such as fumed silica, to achieve optimum physical properties in the final molded product, the silica filler can cause an undesireable increase in the viscosity of the mixture which can intefere with pumping velocity. The expression, "application rate", which means g/min of heat curable silicone mixture delivered through a ¼ inch nozzle at 90 psi, is often the standard used in the silicone industry.

Existing methods for making fumed silica includes burning a combustible mixture of a silicon halide and an oxygen containing gas to produce primary silicon dioxide particles which form aggregates having an average convex perimeter of about 0.5 to about 1.5 microns. One solution to the problem of viscosity build-up in LIM formulations is to reduce the average aggregate size of the fumed silica before it is blended with the silicone oil. A method for effecting fumed silica aggregate size reduction is shown by Kratel et al. U.S. Pat. No. 3,953,487. For example, SiO₂ aggregates are subjected to mechanical impact, such as "ball milling", in the presence of an organosilazane. Another method of provided fumed silica aggregate having a reduced average size is shown by Rohr et al. U.S. Pat. No. 5,340,560, involving the burning of an organosilicon material, such as a silane, or an organosilane in the presence of an oxygen containing mixture. Alternative procedures for overcoming the inherent problem of avoiding viscosity build-up in fumed silicapolydiorganosiloxane oil blends is to add all of the fumed silica to one of the components, such as component A, which can be worked more intensely, prior to the addition of component B which would be at a lower viscosity, and therefor facilitate the processing of the ingredients in certain instances.

It would be desireable therefor to provide additional techniques for making molded silicone parts capable of satisfying the high tensile and tear strength requirements of LIM fabricators. It also would be desireable to be able to injection mold heat curable blends of silicone oil and fumed silica comprising aggregates of primary silicon dioxide particles having an average convex perimeter of about 0.5 to about 1.5 microns without having to pre-mill the fumed silica.

SUMMARY OF THE INVENTION

The present invention is based the discovery that significant improvements in the processing characteristics with respect enhanced flow rate of LIM silicone blends which result from the treatment of blends comprising polydiorganosiloxane oil and fumed silica comprising aggregates of primary silicon dioxide particles having an average convex perimeter of about 0.5 to about 1.5 microns can be achieved if the polydiorganosiloxane oil is cooled to a temperature of at least −10° C. prior to being contact with the fumed silica. It is not completely understood why the resulting "paste" formed after the fumed silica is added and processed with the refrigerated polydiorganosiloxane oil, has a significantly higher "application rate" as defined hereinafter, as compared to the same polydiorganosiloxane oil-fumed silica blend made in accordance with the prior art is not completely understood. One possible explanation is that the initial cooling of the polydiorganosiloxane oil reduces interactions between the silicone polymer and filler. In addition, the filler aggregates can be more readily broken during the early processing stages when the filler is initially added to the cooled polydiorganosiloxane fluid which is at a higher viscosity than under normal conditions to produce a high viscosity blend. Further, the presence of processing aids, such as organosilazanes, or methoxy, or silanol containing fluids, favors interaction between the processing aid and nascent surfaces generated by a breakdown of silica aggregate prior to interaction between the polydiorganosiloxane fluid and filler.

STATEMENT OF THE INVENTION

There is provided by the present invention, a silicone paste having an application rate of greater than 60 to about 400 g/min through a ¼ inch nozzle at 90 psi, comprising by weight, (A) 100 parts of a vinyl containing polydiorganosiloxane oil having a viscosity of about 20,000 centipoise to about 100,000 centipoise at 25° C., and (B) about 20 to about 50 parts of reinforcing silica filler, which silicone paste is made by adding the reinforcing silica filler to the vinyl containing polydiorganosiloxane oil while the vinyl containing polydiorganosiloxane oil is being agitated at a temperature in the range of between about −10° C. to about −60° C. and the agitation of the mixture is continued until the vinyl containing polydiorganosiloxane oil and reinforcing silica filler forms a substantially uniform paste.

In a further aspect of the present invention, there is provided a method for making a molded silicone rubber part by a LIM procedure, which comprises injection molding a heat curable mixture comprising by weight, (a) 100 parts of a vinyl containing polydiorganopolysiloxane oil, (b) about 20 to about 50 parts of reinforcing silica filler, (c) about 0.5 to about 2.5 parts of a siloxane hydride, and (d) an amount of a platinum group metal catalyst which is sufficient to effect addition between the siloxane hydride of (c) and the vinyl containing polydiorganopolysiloxane oil of (a), where the vinyl containing polydiorganopolysiloxane oil of (a) and the reinforcing silica filler of (b) are used in the form of a silicone paste to make the heat curable mixture, which silicone paste is made by adding the reinforcing silica filler to the vinyl containing polydiorganosiloxane oil while the vinyl containing polydiorganosiloxane oil is being agitated at a temperature in the range of between $-10°$ C. to $-60°$ C. and the agitation of the mixture is continued until the vinyl containing polydiorganosiloxane oil and reinforcing silica filler forms a substantially uniform paste.

DETAILED DESCRIPTION OF THE INVENTION

The vinyl containing polydiorganopolysiloxane oil used in making the silicone paste can have a viscosity, in the range of 5000 to 1,000,000 centipoise at $25°$ C. and preferably, 20,000 to 100,000 centipoise at $25°$ C. The vinyl containing polydiorganopolysiloxane oil also can include a lower viscosity vinyl containing polydiorganopolysiloxane oil having a viscosity in the range of 50 to 5000 centipoise which can be present at from 5 to 40 parts by weight per 100 parts of the higher viscosity vinyl polydiorganopolysiloxane oil. The vinyl containing polydiorganopolysiloxane oil can be substituted with vinyl radicals attached to silicon by carbon-silicon bonds on terminal siloxy units or on siloxy units in the polysiloxane backbone. The vinyl content can vary between 0.01 to 60 mole percent, while the balance of the organo radicals can be selected from $C_{(1-13)}$ monovalent organo radicals, for example, $C_{(1-8)}$ alkyl radicals, and $C_{(6-13)}$ aryl radicals. Preferably, the radicals other than vinyl are methyl, a mixture of methyl and phenyl, a mixture of methyl and trifluoropropyl, or mixtures of such radicals.

The siloxane hydride can be selected from a hydrogen terminated polydiorganosiloxane fluid having a viscosity of 1 to 500 centipoise at $25°$ C., where the organo radicals can be selected from the previously defined $C_{(1-13)}$ monovalent organo radicals shown for the vinyl containing polydiorganopolysiloxane oil, with the proviso that they are free of olefinic unsaturation; for example, $C_{(1-8)}$ alkyl radicals, and $C_{(6-13)}$ aryl radicals. The siloxane hydride also can include siloxane hydride resins having $SiO_2$ units. The siloxane hydride can have from 0.04 to 1.7 weight percent hydrogen which can be in the terminal position, on the backbone, or a mixture thereof.

Some of the platinum catalysts which can be used in the practice of the invention are for example chloroplatinic acid, finely divided platinum metal, platinum on a carrier such as carbon; platinum catalysts shown by Ashby, U.S. Pat. No. 3,159,662, Lamoreaux, U.S. Pat. No. 3,220,972, and Karstedt, U.S. Pat. No. 3,775,452, all of which are incorporated herein by reference. An effective amount of platinum catalyst is 5 ppm to 200 ppm, based on the weight of the heat curable LIM formulation.

Illustrative of the various reinforcing silica fillers which can be used in the practice of the invention are preferably fumed silica filler which can be treated in accordance with a cyclic polydiorganosiloxane such as octamethylcyclotetrasiloxane, as shown by Lucas U.S. Pat. No. 2,938,009. Additional reinforcing fillers are precipitated silica; silazane treated reinforcing silica fillers as shown by Smith U.S. Pat. No. 3,635,743 are also of interest. If desired, other fillers, such as titanium dioxide, lithepone, zinc oxide, zirconlure silicate, silica aerogel, iron oxide, and diatomaceous earth also can be used.

In the practice of the preferred form of the invention, the silicone paste can be made by adding the vinyl containing polydiorganopolysiloxane oil to a mixer, such as a doughmixer, and the oil is cooled to a low temperature as previously shown in the Statment Of The Invention. Cooling can be achieved by conventional mechanical refrigeration, or by use of a refrigerant, such as the addition of liquid or solid $CO_2$ to the batch, if desired. Process aids also can be added with the vinyl containing polydiorganopolysiloxane oil, where there can be used from about 2 to about 15 parts by weight of process aid, per 100 parts of polydiorganopolysiloxane oil. Some of the process aids include organosilazanes, such as hexamethyldisilazane, vinyltriethoxy silane, and low molecular weight silanol containing polydimethylsiloxane fluids. As the temperature of the silicone material decreases, a crystalline temperature can be approached at about $-60°$ C. The reinforcing silica filler can then be added in increments while the mixture is agitated. Agitation of the mixture can continue for about 0.4 to 2 hours after all the filler has been added. The resulting silicone paste can be recovered when the temperature of the mixture has become constant at ambient conditions.

A typical LIM formulation can be prepared by blending the silicone paste with the siloxane hydride and the platinum catalyst. A preferred procedure is to incorporate the platinum catalyst within the defined ppm limits of platinum into a portion of the silicone paste to form "LIM component A" and blend the siloxane hydride with a portion of the silicone paste to form "LIM component B". Standard LIM procedures can then be used to form molded silicone parts having a high tensile and high tear strength.

The following example will further illustrate the practice of the invention. All parts are by weight unless otherwise stated.

EXAMPLE

There are added to a doughmixer, a mixture of 64.5 parts of a vinyl terminated polydimethylsiloxane oil having a viscosity of 40,000 centipoise at $25°$ C., 1 part of vinyltriethoxysilane, 6 parts of hexamethyldisilazane, 4 parts of a 500 centipoise vinylterminated polydimethylsiloxane oil containing 3.5 mole % methylvinylsiloxy units and 96.5 mole % dimethylsiloxy units, and 4 parts of a polydimethylsiloxane fluid having a viscosity of 1000 centipoise at $25°$ C. with terminal trimethylsiloxy units and dimethylvinylsiloxy units. Dry ice is then added to reduce the temperature to about $-40°$ C. There is then added in six increments to the cooled silicone mixture while it is stirring, 25 parts of fumed silica having a surface area of 325 meters per gram, which has been treated with octamethylcyclotetrasiloxane. Additional dry ice is added to the batch until the smooth, high viscosity mixture begins to "break-up" and is no longer a smooth consistency. The temperature is about $-60°$ C. and is of a very high viscosity. After about 15 minutes, the mixture is allowed to warm from frictional heating. After one hour, the batch is heated to $140°$ C. with a strong nitrogen purge. There is obtained, a silicone paste, referred to hereinafter as the "cooled silicone paste".

Following the above procedure, about 43 parts (⅔) of the vinyl terminated polydimethylsiloxane oil having a viscosity of 40,000 centipoise at $25°$ C. is added to the doughmixer along with the other silicone materials. The treated fumed silica is added over a period of 30 minutes. After the filler is added, the temperature of the mixture is raised to about 80° C. for 1.5 hours. The remaining ⅓ of the vinyl terminated polydimethylsiloxane oil having a viscosity of 40,000 centipoise at 25° C. is added and the final mixture is heated to 140° C. for one hour with a strong nitrogen purge. There is obtained a silicone a paste, referred to hereinafter as "uncooled silicone paste".

The application rates of the respective silicone pastes were measured by extruding the pastes through a ¼ inch orifice at 90 psi. The application rate of the uncooled silicone paste was 60 g per minute, while the cooled paste had an application rate of 120 g per minute.

LIM compositions are prepared by adding to each of the above respective cooled and uncooled silicone pastes, 1.71 parts of a siloxane hydride having a viscosity of 50 centipoise at 50° C., and 0.99% by weight of hydrogen attached to silicon, and sufficient platinum catalyst shown by Karstedt, U.S. Pat. No. 3, 775,452, to provide 15 ppm Pt.

The LIM compositions were cured in molds at 400° C. for 12 minutes. The following results were obtained where cooled means the cooled silicone paste, and uncooled means uncooled silicone paste:

| | Cooled | Uncooled |
|---|---|---|
| Tensile strength, psi | 1064 | 1100 |
| Hardness, shore A | 41 | 43 |
| Elongation, % | 512 | 570 |
| Tear strength, lbs/in | 217 | 225 |
| Specific gravity | 1.119 | 1.120 |
| Application rate | 60 g/min | 120 g/min |

The above results show a significant improvement in application rate for the silicone paste of the invention as compared to the prior art. As a result, the LIM compositions of the present invention, based on the employment of the silicone pastes of the present invention, can be metered into molds at a much higher rate than the LIM compositions of the prior art.

What is claimed is:

1. A silicone paste having an application rate of greater than 60 to about 400 g/min through a ¼ inch nozzle at 90 psi, comprising by weight, (A) 100 parts of a vinyl containing polydiorganosiloxane oil having a viscosity of about 20,000 centipoise to about 100,000 centipoise at 25° C., and (B) about 20 to about 50 parts of reinforcing silica filler, which silicone paste is made by adding the reinforcing silica filler to the vinyl containing polydiorganosiloxane oil while the vinyl containing polydiorganosiloxane oil is being agitated at a temperature in the range of between about −10° to about −60° C. and the agitation of the mixture is continued until the vinyl containing polydiorganosiloxane oil and reinforcing silica filler forms a substantially uniform paste.

2. A silicone paste in accordance with claim 1, where the vinyl containing polydiorganosiloxane oil is a vinyl terminated polydimethylsiloxane.

3. A silicone paste in accordance with claim 1, where the reinforcing silica filler is fumed silica filler.

4. A method for making a molded silicone rubber part by a LIM procedure, which comprises injection molding a heat curable mixture comprising by weight, (a) 100 parts of a vinyl containing polydiorganopolysiloxane oil, (b) about 20 to about 50 parts of reinforcing silica filler, (c) about 0.5 to about 2.5 parts of a siloxane hydride, and (d) an amount of a platinum group metal catalyst which is sufficient to effect addition between the siloxane hydride of (c) and the vinyl containing polydiorganopolysiloxane oil of (a), where the vinyl containing polydiorganopolysiloxane oil of (a) and the reinforcing silica filler of (b) are present in the form of a silicone paste to make the heat curable mixture, which silicone paste is made by adding the reinforcing silica filler to the vinyl containing polydiorganosiloxane oil while the vinyl containing polydiorganosiloxane oil is being agitated at a temperature in the range of between −10° C. to −60° C. and the agitation of the mixture is continued until the vinyl containing polydiorganosiloxane oil and reinforcing silica filler forms a substantially uniform paste.

5. A method in accordance with claim 4, where the vinyl containing polydiorganosiloxane oil is a vinyl terminated polydimethylsiloxane.

6. A method in accordance with claim 4, where the temperature of the vinyl containing polydiorganosiloxane oil is maintained by use of mechanical refrigeration.

7. A method in accordance with claim 4, where the temperature of the vinyl containing polydiorganosiloxane oil is maintained by use of liquid carbon dioxide.

8. A method in accordance with claim 4, where the temperature of the vinyl containing polydiorganosiloxane oil is maintained by use of dry ice.

9. A method in accordance with claim 4, where the reinforcing silica filler is fumed silica.

10. A method in accordance with claim 4, where the siloxane hydride has 0.04 to 1.7 weight percent hydrogen.

* * * * *

UNITED STATES PATENT AND TRADEMARK OFFICE
CERTIFICATE OF CORRECTION

PATENT NO. : 5,559,183
DATED : September 24, 1996
INVENTOR(S) : John S. Razzano

It is certified that error appears in the above-indentified patent and that said Letters Patent is hereby corrected as shown below:

Column 5, headings should read as follows:

The second column heading should be "Cooled" instead of Uncooled" and
The third column shoudl be headed "Uncooled".
The first column should not have the heading "Cooled".

Signed and Sealed this

Seventeenth Day of December, 1996

*Attest:*

BRUCE LEHMAN

*Attesting Officer*     *Commissioner of Patents and Trademarks*